United States Patent [19]

DeVolpi

[11] Patent Number: 4,920,334
[45] Date of Patent: Apr. 24, 1990

[54] SECURITY SYSTEM FOR BICYCLES, SKI RACKS AND COAT RACKS

[76] Inventor: Dean R. DeVolpi, 603 Columbine, Lisle, Ill. 60532

[21] Appl. No.: 341,837

[22] Filed: Apr. 24, 1989

[51] Int. Cl.⁵ .................... G08B 13/14; H01H 47/00
[52] U.S. Cl. .................................. 340/568; 361/172
[58] Field of Search ........ 340/568, 571, 572, 542–543; 361/172

[56] References Cited

U.S. PATENT DOCUMENTS

| | | | |
|---|---|---|---|
| 3,660,590 | 5/1972 | Conant | 174/47 |
| 3,866,205 | 2/1975 | Payne et al. | 340/571 |
| 4,023,157 | 5/1977 | Miller | 340/571 |
| 4,275,294 | 6/1981 | Davidson | 250/227 |
| 4,292,628 | 9/1981 | Sadler | 340/531 |
| 4,379,289 | 4/1983 | Peek | 340/555 |
| 4,379,334 | 4/1983 | Feagins, Jr. et al. | 364/467 |
| 4,398,089 | 8/1983 | Sharpe | 340/572 X |
| 4,525,702 | 6/1985 | Kitagawa et al. | 340/571 X |
| 4,536,754 | 8/1985 | Holce et al. | 340/568 |
| 4,546,345 | 10/1985 | Naito | 340/542 |
| 4,654,640 | 3/1987 | Carll et al. | 340/572 X |
| 4,698,620 | 10/1987 | Marshall | 340/568 |
| 4,717,235 | 1/1988 | Kitagawa et al. | 350/96.23 |
| 4,746,909 | 5/1988 | Israel et al. | 340/568 |
| 4,760,382 | 7/1988 | Faulkner | 340/572 |
| 4,773,020 | 9/1988 | Anderson et al. | 364/464.01 |
| 4,812,670 | 3/1989 | Goulet | 307/10.2 |
| 4,812,841 | 3/1989 | Chen | 340/543 X |
| 4,833,456 | 5/1989 | Heller | 340/571 |

Primary Examiner—Joseph A. Orsino
Assistant Examiner—Thomas J. Mullen, Jr.
Attorney, Agent, or Firm—Hill, Van Santen, Steadman & Simpson

[57] ABSTRACT

A security system for bicycles, ski racks and coat racks which includes a control in which a user can place a specific code for the specific lock which is to be used after which a free end of the cable can be passed through the device to be secured such as a bicycle, coat or a pair of skis and then inserted into the receptacle which locks. The security system includes an alarm when the cable carries either an electrical, a fibre optic or a pneumatic line such that if the cable is severed by a thief that an alarm system will instantly be actuated so as to prevent the theft. The user can release the cable by entering the known code when the article is to be removed which allows the one end of the cable to be unlocked from its holding socket.

7 Claims, 3 Drawing Sheets

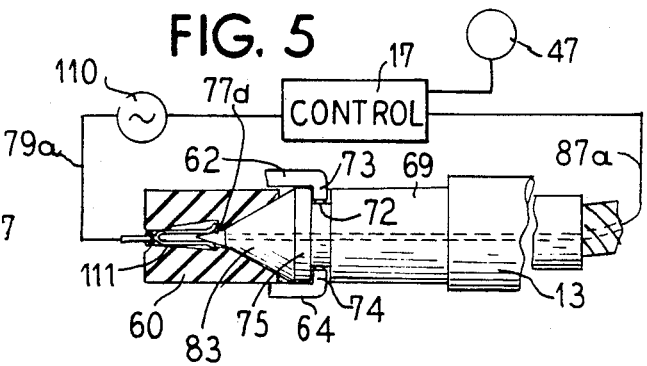
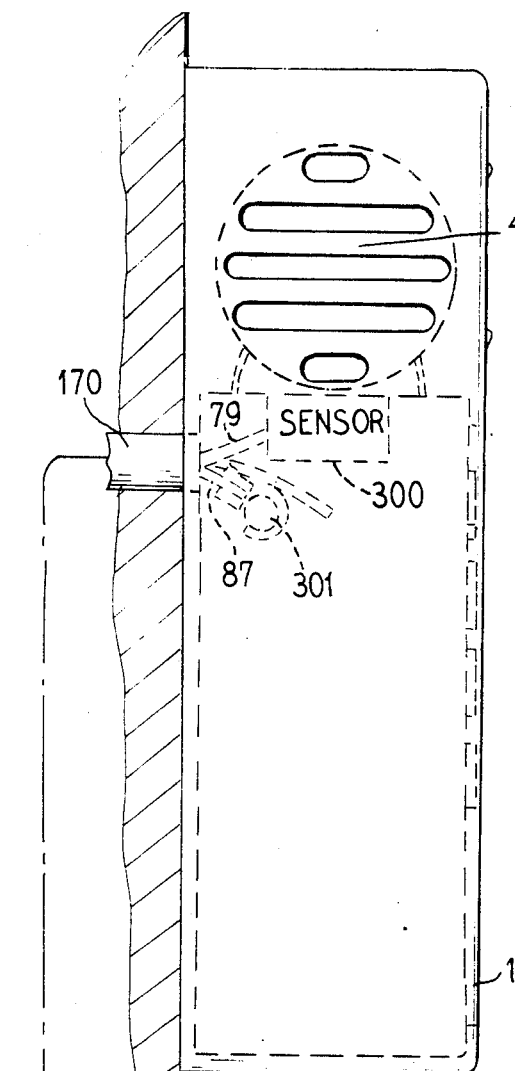
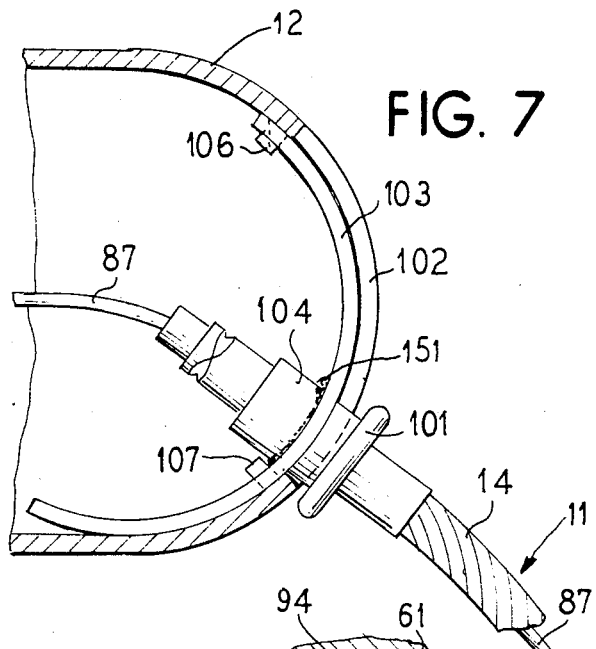
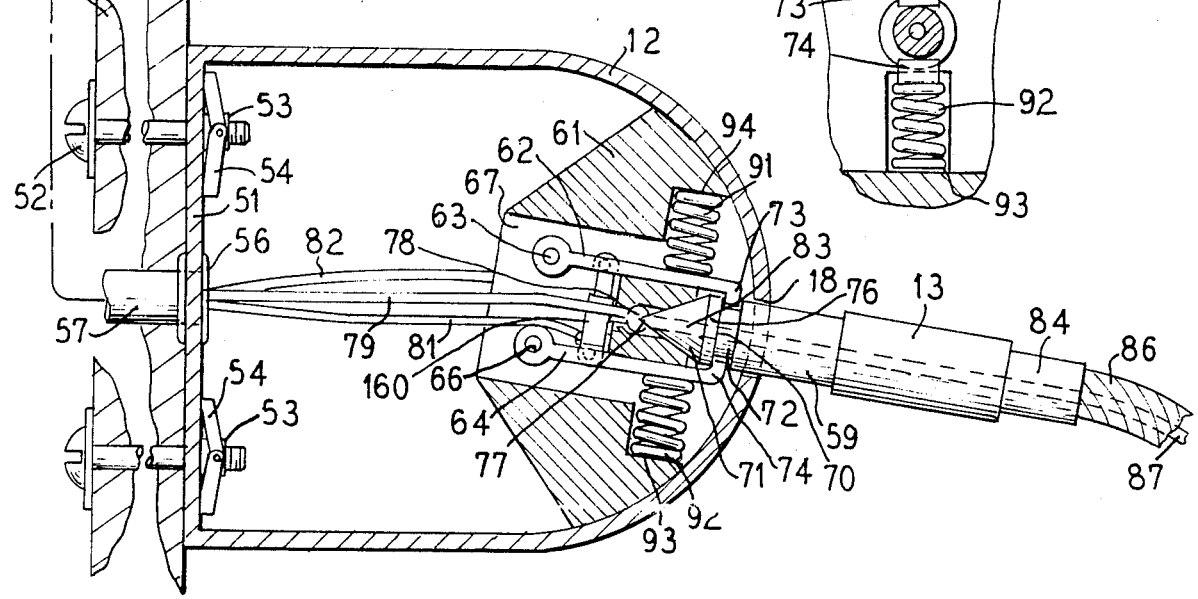

SECURITY SYSTEM FOR BICYCLES, SKI RACKS AND COAT RACKS

BACKGROUND OF THE INVENTION

1. Field of the Invention

This invention relates to a security system for bicycles, skis, clothing such as jackets in stores or elsewhere.

2. Description of the Related Art

The following U.S. patents disclose various types of security and detection systems, U.S. Pat. Nos. 4,399,430, 3,660,590, 4,717,235, 3,660,729, 3,906,447, 3,948,375, 4,228,519, 4,283,710, 4,379,334, 4,433,787, 4,773,020, 3,952,850, 3,877,266, 3,831,408, 3,757,916, 4,773,020, 4,275,294, 4,379,289, 4,812,841 and 4,292,628.

SUMMARY OF THE INVENTION

The invention has the objective of reducing the thefts of items such as bicycles, skis and jacket and clothing items in stores. There is an alarming increase of theft of such items and unlike other parking systems that generate revenue, the invention provides a tangible service so that an owner of an item is motivated to make a contribution to protect their possessions. The store unit is capable of preventing the most critical theft such as employee theft by keeping a hard record of who released the article last and it is capable of making two persons involved within the store for each transaction. By having a cable that can be armed with an active wire for an electrical system or by fiber optics using a light beam and/or a tube using air fluid which is wound through the protective item it becomes nearly impossible with today's technology to cut the cable without disturbing the transmission of a signal through such media, thus, setting off an alarm.

A major advantage of the invention is that it is a commercially viable product that can be inexpensively manufactured and utilized in a simple manner.

Prior art systems propose mechanical locking systems which result in high failure rates and high manufacturing costs whereas the invention results in a simple and reliable cable system.

The same unit may also be used for coat racks in checkrooms. Inevitably, coats or jackets are stolen from manner coat checkrooms because the person who operates the checkroom becomes bored and walks off for a minute or two during which time an expensive jacket can be stolen which results in the proprietor generally being liable. The present invention will reduce labor costs in coat checking systems.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 5 is a partially sectional detail view illustrating an electrical alarm system;

FIG. 6 is a partially sectioned view illustrating a fibre-optics alarm system;

FIG. 7 is a sectional view of the invention;

FIG. 8 is a partially sectional detail view of the invention; and

DESCRIPTION OF THE PREFERRED EMBODIMENTS

The present invention comprises an anti-theft system or security system which has alarm status input devices with a plurality of cable and each cable is capable of being intertwined through an item which is to be protected. If the cable is severed by a thief, an alarm will be actuated. Each cable can also be armored using electrical wire, fibre-optics or pneumatic tubing so as to sense when the cable is severed. Alarm status output devices such as audio, horns, buzzers or visual outputs as flashing lights or if transmitters, telephone communication devices, permanent storage medium such as optical disk, magnetic storage mediums such as disk, tape or wire can be utilized. Input devices such as audio which uses voice recognition, keypads, cards, magnetic readers, keys material analysis, optical, RF, touch screen, coin, token, bill readers, video and other inputs devices can be utilized.

Figure 1:
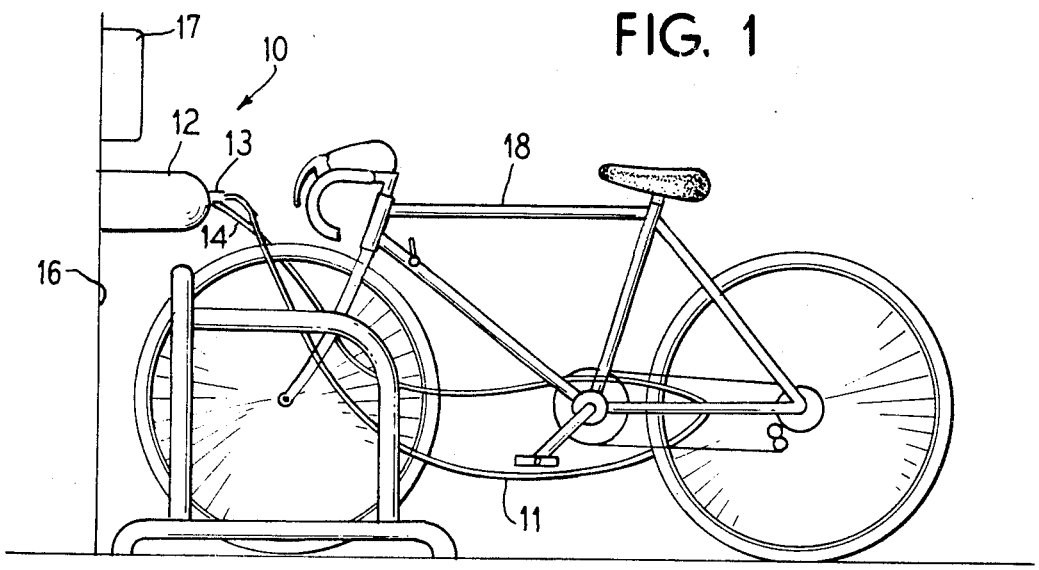
FIG. 1 is a plan view illustrating the security system of the invention.

FIG. 1 illustrates a bicycle 18 which is protected by the security system 10 of the invention. A flexible cable 11 has one end 14 connected to a holding bracket 12 mounted on a wall 16 and the other end 13 is detachably connected to the bracket 12. A control unit 17 is connected to the bracket so as to lock and unlock the end 13 and also to monitor the condition of the cable 11 such that if it is broken, an alarm will be produced.

Figure 4:
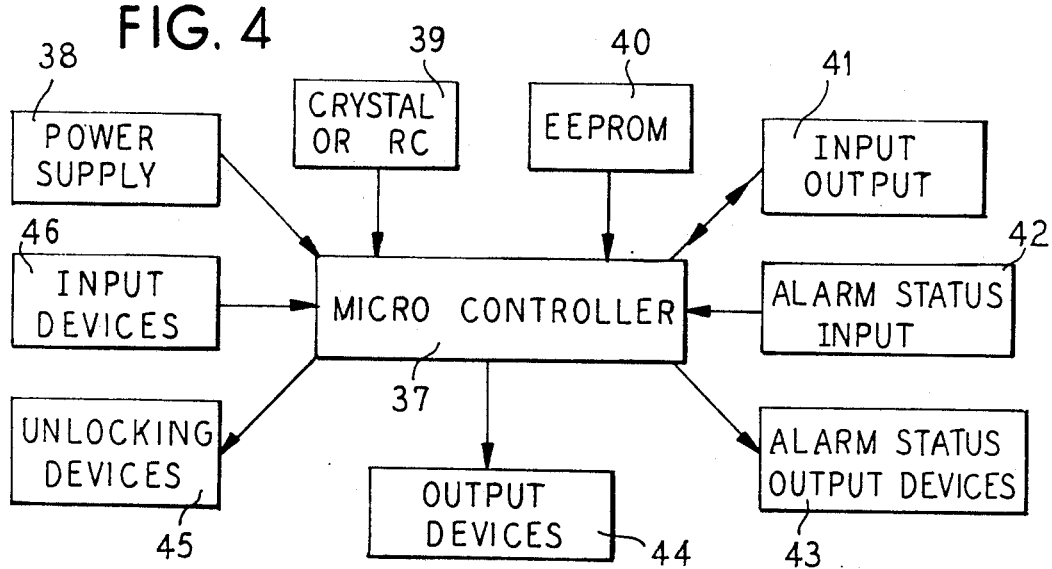
FIG. 4 is a block diagram illustrating the electrical system of the invention.

FIG. 4 illustrates the controls 17 of the device which comprises a power supply 38 that may be battery, solar cells, AC or DC power. A crystal or RC network 39 is connected to a micro-controller 37 as is the power supply 38. An EEPROM 40 is connected to the micro-controller and is capable of storing information even when power disappears to the micro-controller 37. Input/output device 41 might comprise a telephone which is connected to the micro-controller 37. Alarm status input devices 42 are connected to the micro-controller and may comprise wires, tubes and fiber optics so as to sense if the cable 11 has been severed. Alarm status output devices 43 are connected to the micro-controller and may comprise audio devices, visual devices, RF devices, telephone devices, cable devices, and storage medium such as a computer disk and may be optical or magnetic. Output devices 44 connected to the micro-controller 37 and may comprise video, audio, LCD's, fluorescent or LEDs which display entered code numbers etc. Unlocking devices 45 may comprise a solenoid or relay operated by air or magnetic or thermal power or motors which are connected to the micro-controller 37. Input devices 46 are connected to the micro-controller and may comprise keypads, cards, key fingerprint, reader, material, video, touch screen, magnetic, audio, thermal RF, coin slot, bill readers, token acceptors, or optical devices.

Figure 3:
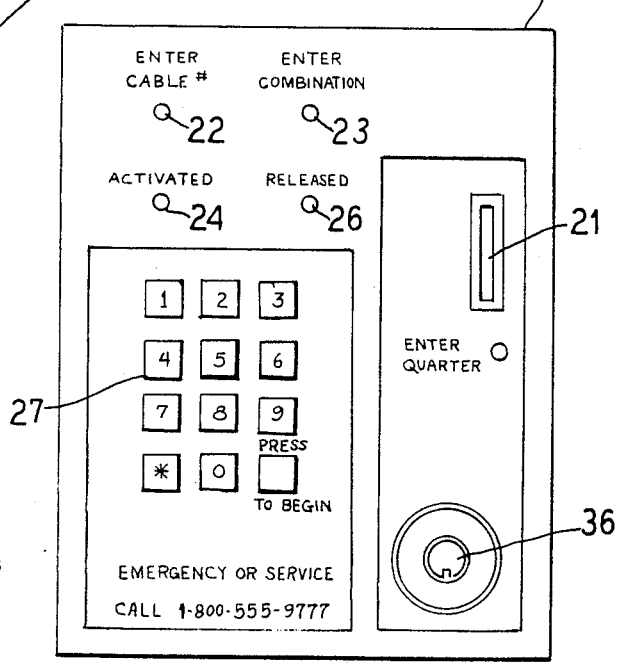
FIG. 3 illustrates the control box of the invention.

FIG. 3 illustrates a control device 17 in an enlarged plan view which has a coin slot 21 and an indicator light 22 which states Enter Cable Number. Another indicator light 23 is for Entering Combinations, another light 24 is for indicating Actuated and another light 26 indicates Released. A keypad 27 allows the entry of combinations so as to set the locking device.

Figure 2:
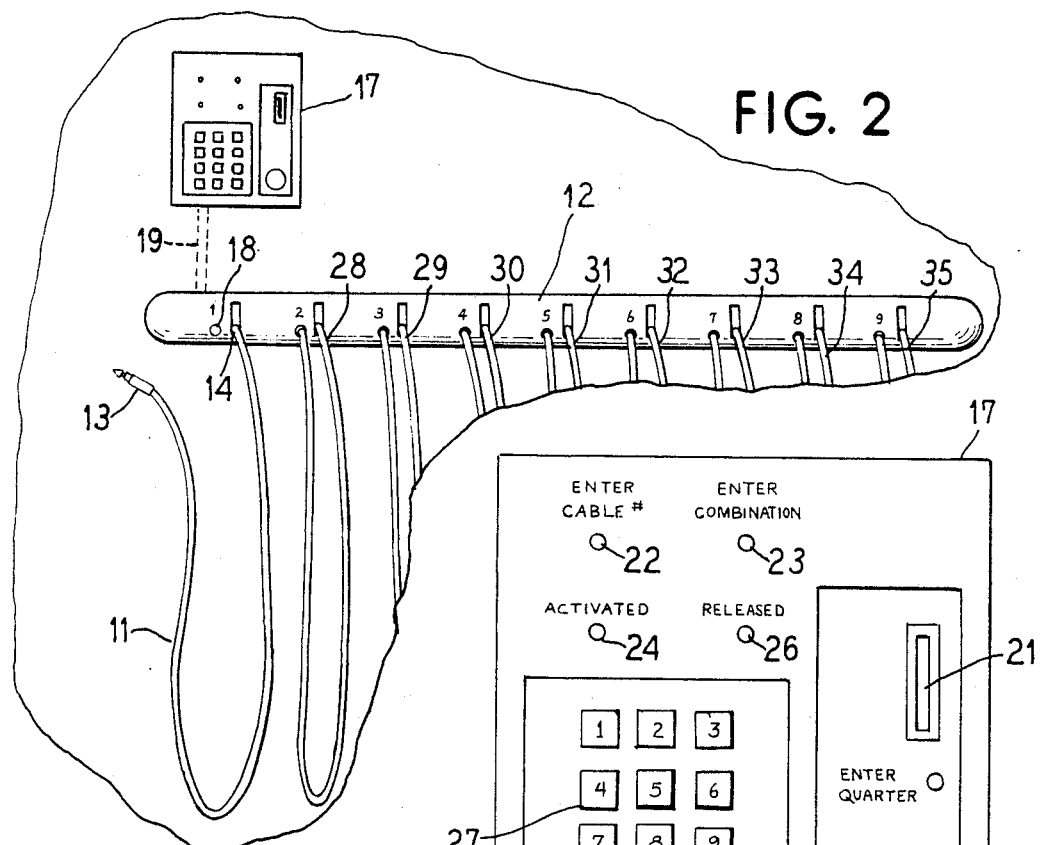
FIG. 2 is a plan view of the invention.

FIG. 2 is a plan view illustrating the bracket 12 which is connected to the wall 16 as well as the control 17. A cable 19 extends from the control 17 to the inside of the bracket 12.

The end 14 of the cable 11 connects to the bracket 12 as shown in detail in FIG. 7. The inside of the bracket is hollow and a slot 102 is formed in the bracket 12 adjacent each of the cable ends 14 so that the cable may move vertically in the slot as illustrated for example, in FIG. 2. A curved cover member 103 fits over the slot 102 and is moveable on pins 106 and 107 which move in slots formed in the member 103. The member 103 is connected to a cylindrical member 104 which is connected to the cable end 14 as shown in FIG. 7. A collar 101 provides an additional cover of the slot 102 and the cylindrical member 104 is welded with the suitable weld 151 to the member 103 as shown. A sensing cable 11 extends through the cable 87 for purposes to be described.

The end 13 of the cable 11 is receivable in the openings 18 in the bracket 12 as best shown in FIG. 6 and 8. A sensing conductor 87 extends through the cable 11 and a first covering 86 surrounds the sensor 87. An outer protective coating 84 surrounds the coating 86. The protective coating 84 might, for example, be an armored braid so as to protect the cable 11. The end 13 has an extension 59 which can be inserted in the opening 18 of the bracket 12. The extension 59 is formed with a portion 72 of reduced cross-sectional area to form a shoulder 70 behind an enlarged head portion 76 which is formed with the tapered point 83. The shoulder 70 can be engaged by a pair of pivoted jaws 62 and 64 which are pivotally connected by pivot pins 63 and 66 to a locking member 61 which is attached to the inside of the bracket 12 as shown in FIG. 6. A pair of springs 91 and 92 are respectively mounted between the jaws 62 and 64 and shoulders 94 and 93 formed in the member 61 so as to bias the jaws 72 and 73 of the locking arm 62 and 64 into the reduced portion 72 so as to lock the jaws behind the enlarged portion 76 as shown in FIG. 6. A solenoid 160 is mounted between the pivot arm 62 and 64 and electrically connected by leads 81 and 82 to the control unit 17. The solenoid when energized, moves the pivot arms 62 and 64 toward each other so that the jaws 73 and 74 lock the end 13 in the bracket 12. The cable 11 is formed with a security system comprising in FIG. 6 a fibre optic cable 87 which extends through the sheaths 86, 84 and 13 and terminates at the point 77 where the end 83 of the fiber optic cable 87 engages a mating connector 78 which is connected to a fiber optic cable 79 that is connected to the control 17. The other end 14 carries the fiber optic cable 87 as shown in FIG. 7 which is also supplied to the control 17.

The bracket 12 is connected to the wall 16 as shown in FIG. 6. Screws 52 extend through the wall 16 into the internal cavity of the bracket 12 and are threadedly connected to nuts 53 which carry lugs 54 that extend so as to lock the bracket to the wall 16 when the screws 52 are tightened in the nuts 53. The fiber optic cable 79 passes through the wall 16 from the bracket 12 through adapters 57 and 56 and passes to the control 17 through an adaptor 170. The fiber optic cable 79 passes into a sensor 300. The fiber optic cable 87 from the other end 14 is mounted adjacent a light 301 so as to transmit light energy through the fiber optic cable 87. The optical sensor 300 serves when light is not received at the other end of the cable through the fiber optic cable 79 and energizes an audio warning 47 so as to indicate that the fiber optic cable 87 has been cut which indicates that the cable 11 has been cut by a thief or other person.

FIG. 5 illustrates an electrical embodiment wherein the control 17 is connected to a voltage source 110 which is connected to the sensor 79a which is in the cable and which is connected to an electrical connector 111 which is engageable with the end of the cable 77a which forms part of conductor 87a in the member 69 which extends from the point 83 which is gripped by the jaws 73 and 74. If the sensing wire 79a-87a is unbroken, the control will not produce an alarm to the alarm 47. However, if the wire or cable is broken, then a warning will be produced by the control 17.

In use, the suitable amount of money is inserted into the coin slot 21 to actuate the device after which the indicator light 22 will light and the cable number is then entered. Then light 23 will illuminate to indicate to the user to insert a combination into the control by actuating the contacts 27. Suppose, for example, the user desires to use the combination of 943. He would then depress 943 in sequence after inserting the coin 21 in the control 17. The end 13 is then inserted into the socket 18 and the actuated light 24 would then be illuminated. The bicycle will be locked since the cable 11 is passed through it as shown in FIG. 1 before actuating the device. When the bicycle owner returns and desires to release the bicycle, the same combination is entered into the control by using the contacts 27 and the jaws 73 and 74 will release the end of the cable 13. FIG. 2 illustrates nine different cables and each cable can be independently locked and utilized by customers.

The sensing system may also be actuated by a pneumatic sensor by providing air pressure from a suitable source to the inside of the cable such that if the cable 11 is severed the air pressure will disappear and the control 17 will produce a warning indicator.

Figure 9:
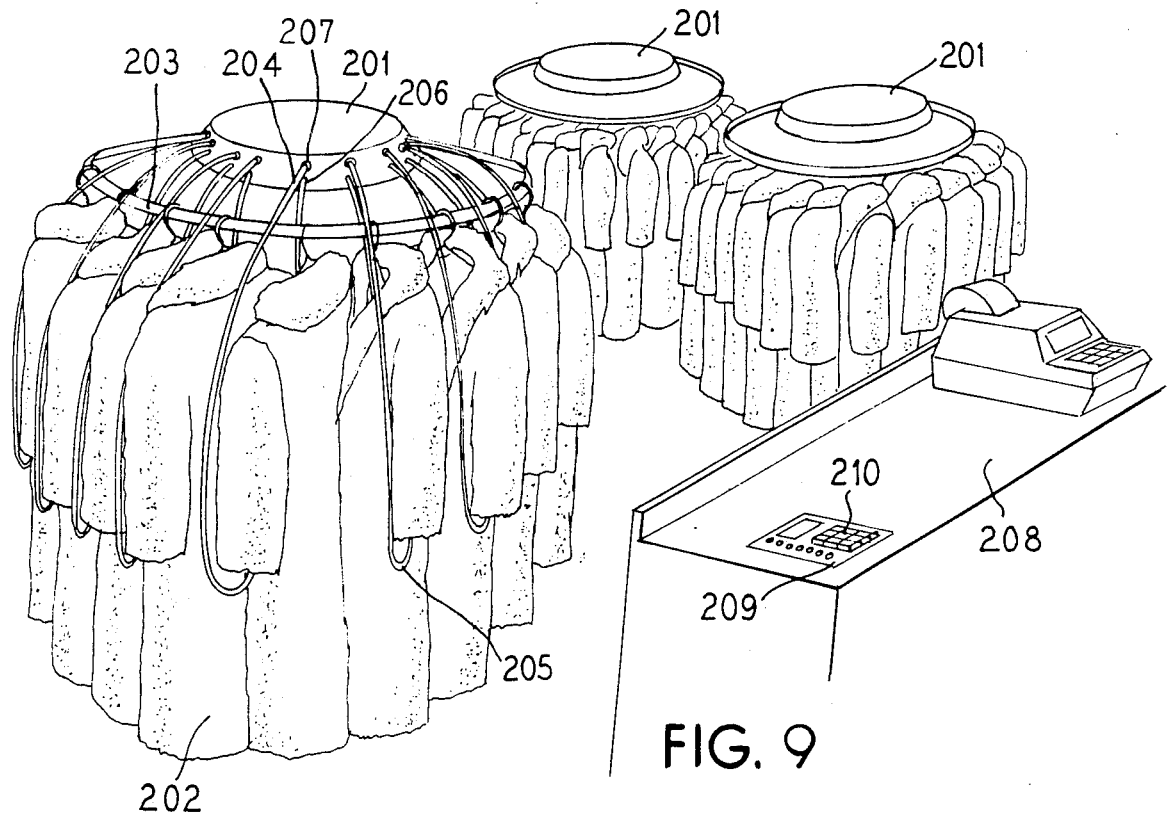
FIG. 9 illustrates a modification of the invention.

FIG. 9 illustrates the invention applied to a security system for clothing as, for example, for coats. A plurality of coat holding stands 201 are provided with supporting rings 203 upon which the coats may be hung and cables 205 have first ends attached to member 201 and may be passed through the sleeves of the coats 202 and one of their ends 204 receivable in a locking opening 207 of the stands 201. A desk 208 which can be controlled by a store clerk has a control 209 with keypad 210 such that the store clerk can selectively by using combinations known only to him release particular coats in the same manner as the bicycles are released in the system illustrated in FIGS. 1, 2 and 3.

Although the invention has been described with respect to preferred embodiments, it is not to be so limited as changes and modifications can be made which are within the full intended scope of the invention as defined by the appended claims.

I claim as my invention:

1. A locking system comprising, a holding member, a flexible locking cable with its first end attached to said holding member and adapted to be passed through an article which is to be locked to said holding member, the second end of said cable formed with a locking shoulder, a pair of locking jaws attached to said holding member and said second end of said cable insertable therein to lock said jaws behind said shoulder, a flexible conduit means which extends through said cable from said first to said second end, an energy transmitter connected to one end of said flexible conduit, and an energy sensor coupled to the other end of said flexible conduit to detect when said cable and flexible conduit are severed, including a micro-controller connected to said locking jaws to lock and unlock them, including a solenoid connected to said locking jaws and to said micro-controller and including an alarm connected to said micro-controller and said energy sensor connected to said micro-controller.

2. A locking system according to claim 1 wherein said energy transmitter transmits light energy.

3. A locking system according to claim 1 wherein said energy transmitter transmits electrical energy.

4. A locking system according to claim 1 wherein said energy transmitter transmits fluid.

5. A locking system according to claim 1 including a control unit connected to said micro-controller and provided with a keypad into which a locking code can be entered for storage in said micro-controller.

6. A locking system according to claim 5 including an EEPROM connected to said micro-controller.

7. A locking device according to claim 5 including a coin acceptor connected to said control unit to enable it.

* * * * *